US012100331B2

(12) United States Patent
Wu et al.

(10) Patent No.: US 12,100,331 B2
(45) Date of Patent: Sep. 24, 2024

(54) DISPLAY MODULE, ELECTRONIC DEVICE AND METHOD OF COMPENSATING FOR COLOR SHIFT OF DISPLAY PANEL

(71) Applicants: Changsha HKC Optoelectronics Co., Ltd., Changsha (CN); HKC CORPORATION LIMITED, Shenzhen (CN)

(72) Inventors: Kerong Wu, Changsha (CN); Baohong Kang, Changsha (CN)

(73) Assignees: CHANGSHA HKC OPTOELECTRONICS CO., LTD., Changsha (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,384

(22) Filed: Dec. 23, 2022

(65) Prior Publication Data

US 2023/0206816 A1 Jun. 29, 2023

(30) Foreign Application Priority Data

Dec. 23, 2021 (CN) ......................... 202111592282.5

(51) Int. Cl.
*G09G 3/20* (2006.01)
*G09G 3/3208* (2016.01)

(52) U.S. Cl.
CPC ......... *G09G 3/2074* (2013.01); *G09G 3/3208* (2013.01); *G09G 2300/0452* (2013.01);
(Continued)

(58) Field of Classification Search
CPC ............... G09G 3/2074; G09G 3/3208; G09G 2300/0452; G09G 2320/0233; G09G 2320/0666; G09G 2320/0242
See application file for complete search history.

(56) References Cited

U.S. PATENT DOCUMENTS 5,363,197 A * 11/1994 Ohno ......................... G01J 3/50 356/406
7,333,080 B2 * 2/2008 Miller .................. G09G 3/2003 345/694

(Continued)

FOREIGN PATENT DOCUMENTS

CN 103617778 A 3/2014
CN 103928498 A 7/2014

(Continued)

OTHER PUBLICATIONS

U.S. Appl. No. 18/091,195, filed Dec. 29, 2022.

*Primary Examiner* — Michael J Jansen, II
(74) *Attorney, Agent, or Firm* — Franklin & Associates International Inc; Matthew F. Lambrinos

(57) ABSTRACT

Disclosed is a method of compensating for a color shift of a display panel, a display module, and an electronic device, in which the method includes: in the case where a color shift occurs in a white screen of the display panel, determining a position where the color shift occurs; changing a timing of sub-pixels lighting the white screen in the position to a timing of red, green and blue pixels; adjusting brightness of the red pixel, brightness of the green pixel and brightness of the blue pixel to compensate for the color shift in the position. The present disclosure solves the technical problem that a color shift repairing technology in the related art can only solve unevenness of brightness within a certain range, resulting in poor repairing effect of the display panel.

13 Claims, 6 Drawing Sheets

(52) U.S. Cl.
CPC ............... *G09G 2320/0233* (2013.01); *G09G 2320/0242* (2013.01); *G09G 2320/0666* (2013.01)

(56) References Cited

U.S. PATENT DOCUMENTS

| | | | | |
|---|---|---|---|---|
| 7,518,584 | B2 * | 4/2009 | Heynderickx | G09G 5/026 345/88 |
| 7,696,965 | B2 * | 4/2010 | Cok | G09G 3/3225 345/55 |
| 7,773,102 | B2 * | 8/2010 | Lee | G09G 3/2003 345/89 |
| 7,884,832 | B2 * | 2/2011 | Alessi | G09G 3/3208 345/589 |
| 8,274,452 | B2 * | 9/2012 | Kim | G09G 3/2003 313/484 |
| 8,289,237 | B2 * | 10/2012 | Choi | G09G 3/3258 |
| 8,860,751 | B2 * | 10/2014 | Sullivan | G06T 11/001 348/739 |
| 9,001,165 | B2 * | 4/2015 | Park | G09G 3/2003 345/83 |
| 9,117,400 | B2 * | 8/2015 | Chaji | G09G 3/2074 |
| 9,286,856 | B2 * | 3/2016 | Park | G09G 3/3225 |
| 9,837,014 | B2 * | 12/2017 | Kim | G09G 3/3208 |
| 9,886,881 | B2 * | 2/2018 | Zhang | G09G 5/02 |
| 9,940,881 | B2 * | 4/2018 | Ninan | G09G 3/3426 |
| 10,290,256 | B2 * | 5/2019 | Kobayashi | G09G 3/2003 |
| 10,553,151 | B2 * | 2/2020 | Xu | G09G 3/2007 |
| 10,672,318 | B2 * | 6/2020 | Lee | G09G 3/3291 |
| 10,706,794 | B2 * | 7/2020 | Zhu | G09G 3/2003 |
| 10,796,622 | B2 * | 10/2020 | Chaji | G06T 7/90 |
| 11,114,024 | B2 * | 9/2021 | Chen | G09G 3/3233 |
| 11,227,560 | B2 * | 1/2022 | Chen | G09G 3/003 |
| 11,348,515 | B2 * | 5/2022 | Yang | G09G 3/3208 |
| 11,443,677 | B2 * | 9/2022 | Han | G09G 3/3208 |
| 11,620,946 | B1 * | 4/2023 | Akyol | G01R 19/00 345/204 |
| 11,647,658 | B2 * | 5/2023 | Ma | H10K 59/122 257/40 |
| 11,676,526 | B2 * | 6/2023 | Hai | G09G 3/006 345/690 |
| 11,763,721 | B2 * | 9/2023 | Wu | G09G 3/2003 345/690 |
| 11,810,520 | B2 * | 11/2023 | Li | G09G 3/3283 |
| 2005/0212728 | A1 * | 9/2005 | Miller | G09G 3/2003 345/76 |
| 2005/0231534 | A1 * | 10/2005 | Lee | G09G 3/2003 345/690 |
| 2006/0158454 | A1 * | 7/2006 | Heynderickx | G09G 5/026 345/589 |
| 2007/0002225 | A1 * | 1/2007 | Baek | G09G 3/3648 349/114 |
| 2007/0290947 | A1 * | 12/2007 | Cok | G09G 3/3225 345/45 |
| 2007/0290957 | A1 * | 12/2007 | Cok | G09G 3/3225 345/77 |
| 2008/0143651 | A1 * | 6/2008 | Choi | G09G 3/3258 345/76 |
| 2008/0170008 | A1 * | 7/2008 | Kim | G09G 3/2003 345/76 |
| 2008/0252653 | A1 * | 10/2008 | Alessi | G09G 3/3208 345/589 |
| 2008/0252797 | A1 * | 10/2008 | Hamer | G09G 3/3208 348/E9.037 |
| 2010/0014000 | A1 * | 1/2010 | Ko | G09G 5/02 348/E5.119 |
| 2010/0019997 | A1 * | 1/2010 | Chui | G09G 3/18 345/83 |
| 2010/0315449 | A1 * | 12/2010 | Chaji | G09G 3/2003 345/77 |
| 2013/0093783 | A1 * | 4/2013 | Sullivan | G09G 3/3607 345/601 |
| 2014/0071189 | A1 * | 3/2014 | Park | G09G 5/02 345/694 |
| 2014/0085170 | A1 * | 3/2014 | Park | G09G 3/3208 345/83 |
| 2014/0204007 | A1 * | 7/2014 | Peana | G09G 3/3607 345/88 |
| 2015/0187261 | A1 * | 7/2015 | Kim | G09G 3/3233 345/77 |
| 2015/0287368 | A1 * | 10/2015 | Ninan | G09G 3/36 345/82 |
| 2016/0293082 | A1 * | 10/2016 | Zhang | G09G 5/02 |
| 2016/0365036 | A1 * | 12/2016 | Xu | G09G 3/3291 |
| 2017/0270843 | A1 * | 9/2017 | Lee | G09G 3/2003 |
| 2017/0295229 | A1 * | 10/2017 | Shams | G06F 3/016 |
| 2017/0330501 | A1 * | 11/2017 | Kobayashi | G09G 3/3406 |
| 2019/0164471 | A1 * | 5/2019 | Xu | G09G 3/2092 |
| 2019/0172404 | A1 * | 6/2019 | Zhu | G09G 3/2003 |
| 2019/0259325 | A1 * | 8/2019 | Chaji | G06T 7/90 |
| 2021/0183305 | A1 * | 6/2021 | Chen | G09G 3/32 |
| 2021/0225246 | A1 * | 7/2021 | Han | G09G 3/20 |
| 2021/0225272 | A1 * | 7/2021 | Yang | G09G 3/2092 |
| 2021/0225307 | A1 * | 7/2021 | Chen | G09G 3/3614 |
| 2021/0408158 | A1 * | 12/2021 | Ma | H10K 59/353 |
| 2022/0293031 | A1 * | 9/2022 | Wu | G09G 3/2003 |
| 2023/0106498 | A1 * | 4/2023 | Hai | G09G 3/2074 345/690 |
| 2023/0114963 | A1 * | 4/2023 | Jun | G09G 5/06 345/601 |
| 2023/0162690 | A1 * | 5/2023 | Li | G09G 3/3406 345/77 |
| 2023/0206816 | A1 * | 6/2023 | Wu | G09G 3/2074 345/204 |
| 2023/0206817 | A1 * | 6/2023 | Wu | G09G 3/3208 345/694 |

FOREIGN PATENT DOCUMENTS

| | | | |
|---|---|---|---|
| CN | 105118413 | A | 12/2015 |
| CN | 107682682 | A | 2/2018 |
| CN | 108154848 | A | 6/2018 |
| CN | 109151431 | A | 1/2019 |
| CN | 109326630 | A | 2/2019 |
| CN | 109767711 | A | 5/2019 |
| CN | 110648628 | A | 1/2020 |
| CN | 112331140 | A | 2/2021 |
| WO | 2016169021 | A1 | 10/2016 |

* cited by examiner

DISPLAY MODULE, ELECTRONIC DEVICE AND METHOD OF COMPENSATING FOR COLOR SHIFT OF DISPLAY PANEL

CROSS REFERENCE TO RELATED APPLICATIONS

This present application claims priority under 35 U.S.C. § 119 to Chinese patent application No. 202111592282.5, filed on Dec. 23, 2021 before the China National Intellectual Property Administration of the People's Republic of China, entitled "Display Module, Electronic Device and Method of Compensating for Color Shift of Display Panel", the contents of which is explicitly incorporated herein by reference in its entirety.

FIELD

The present disclosure relates to the field of display technology, and in particular to a display module, an electronic device and a method of compensating for a color shift of a display panel.

BACKGROUND

An organic light-emitting diode (OLED) display panel has the advantages of high contrast, thin size, and being bent and folded, and has been widely used. Due to the uneven film formation of the OLED evaporation layer or the encapsulation layer and different life spans of red, green and blue pixels, the brightness decay rate of each sub-pixel of the display panel is different, which makes the OLED display panel prone to a color shift. The partial schematic diagram of the OLED display panel on which a color shift occurs is shown in FIG. 1, and the black block is an area of the display panel where a color shift occurs. In the color shift area, the red sub-pixel corresponds to R in the normal area, the green sub-pixel corresponds to G in the normal area, the blue sub-pixel i corresponds to B in the normal area, a white sub-pixel corresponds to W in the normal area. A color shift repairing technology in the related art can only solve uneven brightness within a certain range, resulting in poor repairing effect of the display panel.

SUMMARY

The purpose of embodiments of the present disclosure is to provide a method of compensating for a color shift of a display panel, a display module, and an electronic device, which solve the problem that the color shift repairing technology in the related art can only solve unevenness of brightness within a certain range, resulting in poor repairing effect of the display panel. Specific technical solutions are as follows:

In an aspect, provided is a method of compensating for a color shift of a display panel, comprising: in a case where a color shift occurs in a white screen of the display panel, determining a position where the color shift occurs; changing a timing of sub-pixels lighting the white screen in the position to a timing of red, green and blue pixels; and adjusting brightness of the red pixel, brightness of the green pixel and brightness of the blue pixel to compensate for the color shift in the position.

In another aspect, provided is a display module comprising a display panel and a compensation module connected to the display panel, wherein the compensation module comprises: a determining sub-module configured to determine a position where a color shift occurs in a case where a color shift occurs in a white screen of the display panel; a processing sub-module configured to change a timing of sub-pixels lighting the white screen in the position to a timing of red, green and blue pixels; and an adjustment sub-module configured to adjust brightness of the red pixel, brightness of the green pixel and brightness of the blue pixel to compensate for the color shift in the position.

In still another aspect, provided is an electronic device comprising a processor, a communication interface, a memory and a communication bus, wherein the processor, the communication interface and the memory communicate with each other via the communication bus, wherein the memory is configured to store a computer program; and the processor is configured to implement the method steps in the aspect when executing the computer program stored in the memory.

In yet another aspect of the implementation of the present disclosure, a computer-readable storage medium is also provided, instructions are stored in the computer-readable storage medium, when the instructions are running on a computer, the computer is made to execute the above-mentioned method of compensating for color shift of the display panel in the first aspect.

In the method of compensating for a color shift of a display panel, the display module, and the electronic device provided by embodiments of the present disclosure, by in a case where a color shift occurs in a white screen of the display panel, determining a position where the color shift occurs; changing a timing of sub-pixels lighting the white screen in the position to a timing of red, green and blue pixels; and adjusting brightness of the red pixel, brightness of the green pixel and brightness of the blue pixel, compensation is performed for the color shift in the position; that is, a timing of an area where a color shift occurs as well as the brightness of the red pixel, the brightness of the green pixel and the brightness of the blue pixel can be adjusted in any position of the display panel to compensate for the color shift in the case where a color shift occurs in the white screen of the display panel, so as to solve the technical problem that the color shift repairing technology in the related art can only solve unevenness of brightness within a certain range, resulting in poor repairing effect of the display panel.

Details of one or more embodiments of the present application are presented in the following drawings and descriptions to make additional features, purposes, and advantages of the present application more concise and understandable.

BRIEF DESCRIPTION OF THE DRAWINGS

In order to more clearly illustrate technical solutions in embodiments of the present disclosure or in the related art, accompanying drawings required for description of the embodiments or the related art are briefly introduced below.

DETAILED DESCRIPTION

In order to make the purposes, technical solutions and advantages of the embodiments of the present disclosure clearer, the technical solutions in the embodiments of the present disclosure are clearly and completely described below with reference to the drawings in the embodiments of the present disclosure. Obviously, the described embodiments are part of the embodiments of the present disclosure, but not all of the embodiments. Based on the embodiments in the present disclosure, all other embodiments obtained by those ordinary skilled in the art without creative work shall fall within the protection scope of the present disclosure.

In the following description, suffixes such as "module" and "unit" for representing elements are only used to facilitate description of the present disclosure and have no specific meaning per se. Therefore, "module" and "unit" can be used interchangeably.

The technical solutions in the embodiments of the present disclosure are described below with reference to the accompanying drawings in the embodiments of the present disclosure.

Figure 2:
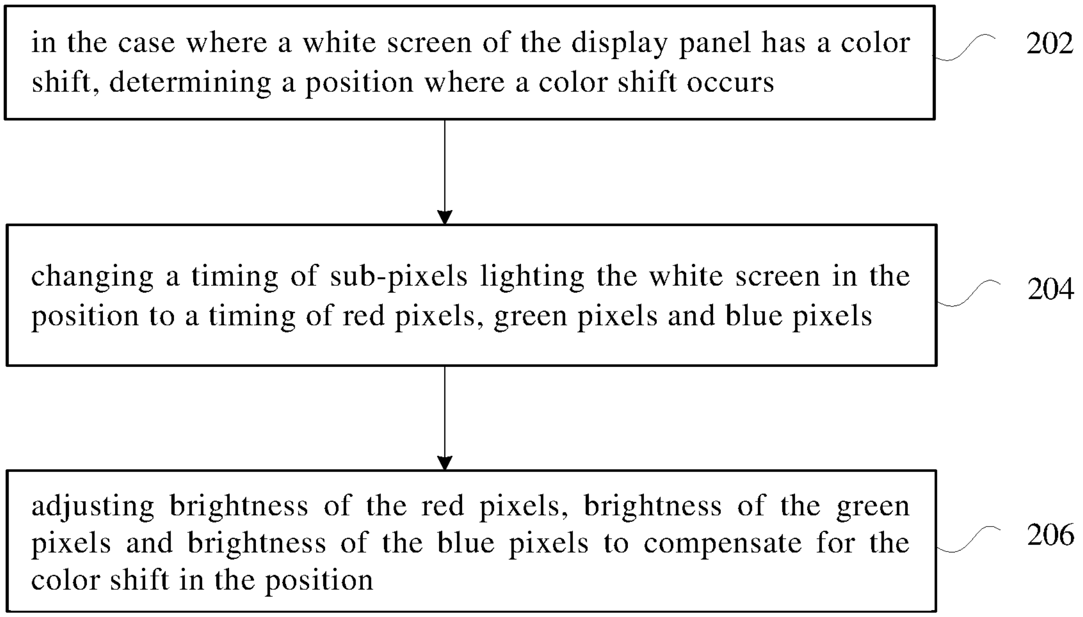
FIG. 2 is a first flow chart of a method of compensating for a color shift of a display panel in an embodiment of the present disclosure.

A first embodiment of the present disclosure provides a method of compensating for a color shift of a display panel, and as shown in FIG. 2, the method comprises the following steps:

Step 202: in the case where a white screen of the display panel has a color shift, determining a position where a color shift occurs;

It should be noted that the method of compensating for a color shift of a display panel provided by the present disclosure is applied to a white organic light-emitting diode (WOLED) display panel. The WOLED display panel comprises RGBW pixels comprising red pixels, green pixels, blue pixels and white pixels; in the case of a color shift in the white screen of the display panel, pixel brightness in a position where a color shift occurs is different from that in other positions, and the position where a color shift occurs can be determined with an external device, for example, a precise image detector (CCD) to analyze brightness information in each position of the screen, so as to determine a position where the brightness is lower or higher which is the position where a color shift occurs. A detector can also be formed in the display panel to detect pixel current flowing through the WOLED. Within a certain range, brightness and the current are directly proportional, and the position where the brightness is lower or higher is determined according to the current, which is the position where a color shift occurs.

Step 204: changing a timing of sub-pixels lighting the white screen in the position to a timing of red pixels, green pixels and blue pixels;

It should be noted that when the OLED display panel displays a white screen, in addition to the white pixels, at least one or two red pixels, green pixels and blue pixels are in a lighted state; for example, when the OLED display panel displays a white screen, combination of the sub-pixels of the white screen can be: the red pixels, blue pixels and white pixels are lighted, or the red pixels, the white pixels are lighted. Thus, after the OLED display panel displays a white screen, that is, a color shift occurs, a timing of the OLED display panel of the present application is changed from an original timing of red, green, blue and white pixels to a timing of red pixels, green pixel and blue pixels.

Step 206: Adjusting brightness of the red pixels, brightness of the green pixels and brightness of the blue pixels to compensate for the color shift in the position.

By the steps 202 to 206 in the embodiment of the present disclosure, in the case where a color shift occurs in the white screen of the display panel, the position where a color shift occurs is determined; the timing of sub-pixels lighting the white screen in the position is changed to the timing of red, green and blue pixels; brightness of the red pixels, brightness of the green pixels and brightness of the blue pixels are adjusted to compensate for the color shift in the position; that is, in the case of a color shift in the white screen of the display panel, a timing of an area where a color shift occurs as well as the brightness of the red pixels, the brightness of the green pixels and the brightness of the blue pixels can be adjusted to compensate for a color shift in any position of the display panel, thereby solving the technical problem that the color shift repairing technology in the related art can only solve uneven brightness within a certain range, resulting in poor repair effect of the display panel.

Figure 3:
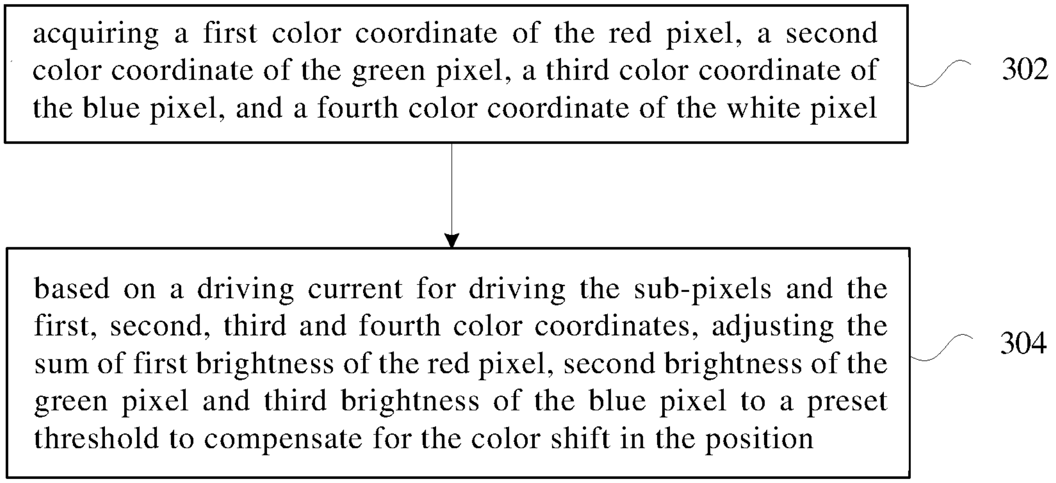
FIG. 3 is a second flow chart of a method of compensating for a color shift of a display panel in an embodiment of the present disclosure.

In a second embodiment of the present disclosure, the adjustment of the brightness of the red pixels, the brightness of the green pixels and the brightness of the blue pixels involved in step 206 of the present disclosure to compensate for the color shift in the position is as shown in FIG. 3, comprising:

Step 302: acquiring a first color coordinate of the red pixel, a second color coordinate of the green pixel, a third color coordinate of the blue pixel, and a fourth color coordinate of the white pixel;

Wherein, it should be noted that a color coordinate accurately represents a color, for example, the first color coordinate of the red pixel is $(x_R,y_R)$, the second color coordinate of the green pixel is $(x_G,y_G)$, the third color coordinate of the blue pixel is $(x_B,y_B)$, and the fourth color coordinate of the white pixel is $(x_W,y_W)$.

Step 304: based on a driving current for driving the sub-pixels and the first, second, third and fourth color coordinates, adjusting the sum of first brightness of the red pixel, second brightness of the green pixel and third brightness of the blue pixel to a preset threshold to compensate for the color shift in the position.

It can be seen that in the application, only the sum value of the first brightness of the red pixel, the second brightness of the green pixel and the third brightness of the blue pixel need to be adjusted to the preset threshold. As for the specific ratio of the first, second and third brightness values, the corresponding settings can be made according to the actual situation in the application.

In a specific embodiment, a correlation between the first color coordinate, the second color coordinate, the third color coordinate, the fourth color coordinate and the first brightness of the red pixel, the second brightness of the green pixel, the third brightness of the blue pixel can be determined according to formulae of tristimulus values and calculation formulae of tristimulus values of a mixed color; for example, the first brightness is $L_R$, the second brightness is $L_G$, and the third brightness is $L_B$. According to the formulae of the tristimulus values, the following formulae 1 can be obtained:

$$\begin{cases} X = \frac{x}{y}L \\ Y = L \\ Z = \frac{1-x-y}{y}L \end{cases}$$

Wherein, X is a red primary color stimulus amount, Y is a green primary color stimulus amount, and Z is a blue primary color stimulus amount; (x,y) is a color coordinate, and L is brightness;

According to the calculation formulae of the tristimulus values of the mixed color, the following formulae 2 can be obtained:

$$X=X_R+X_G+X_B$$

$$Y=Y_R+Y_G+Y_B$$

$$Z=Z_R+Z_G+Z_B$$

Combining the formulae 1 and formulae 2, the following formulae 3 can be obtained:

$$X = \frac{x_R}{y_R}L_R + \frac{x_G}{y_G}L_G + \frac{x_B}{y_B}L_B$$

$$Y = L_R + L_G + L_B$$

$$Z = \frac{1-x_R-y_R}{y_R}L_R + \frac{1-x_G-y_G}{y_G}L_G + \frac{1-x_B-y_B}{y_B}L_B$$

It can be seen that the method of compensating for a color shift of the display panel provided by the embodiment of the present disclosure can determine the correlation between the first color coordinate, the second color coordinate, the third color coordinate, the fourth color coordinate and the first brightness of the red pixel, the second brightness of the green pixel, the third brightness of the blue pixel.

In a third embodiment of the present disclosure, in the method of compensating for a color shift of the display panel provided by the embodiment of the present disclosure, the first color coordinate, the second color coordinate, the third color coordinate, the fourth color coordinate and the first brightness, the second brightness, the third brightness meet the following formulae:

$$L_R = \frac{y_R[(y_W-y_G)(x_B-x_W)+(x_W-x_G)(y_W-y_B)]}{y_B[(y_W-y_g)(x_W-x_R)+(x_W-x_G)(y_R-y_W)]}L_B$$

$$L_G = \frac{y_G(y_R-y_W)[(y_W-y_G)+(x_W-x_G)(y_W-y_B)] + (y_B-y_W)[(y_W-y_G)(x_W-x_R)+(x_W-x_G)(y_R-y_W)]}{y_B(y_W-y_G)[(y_W-y_G)(x_W-x_R)+(x_W-x_G)(y_R-y_W)]}L_B$$

Wherein, $(x_R,y_R)$ is the first color coordinate, $(x_G,y_G)$ is the second color coordinate, $(x_B,y_B)$ is the third color coordinate, $(x_W,y_W)$ is the fourth color coordinate, $L_R$ is the first brightness, $L_G$ is the second brightness, and $L_B$ is the third brightness.

Wherein, it should be noted that the following formulae 4 can be obtained according to the color coordinate formulae:

$$x = \frac{X}{X+Y+Z}$$

$$y = \frac{y}{X+Y+Z}$$

$$z = \frac{Z}{X+Y+Z}$$

Combining the above formulae 3 and formulae 4, relationship formulae between the first color coordinate, the second color coordinate, the third color coordinate, the fourth color coordinate and the first brightness, the second brightness, the third brightness can be obtained.

It can be seen that the method of compensating for a color shift of the display panel provided by the embodiment of the present disclosure can determine the correlation of the first color coordinate, the second color coordinate, the third color coordinate, the fourth color coordinate and the first brightness of the red pixel, the second brightness of the green pixel, the third brightness of the blue pixel.

In a fourth embodiment of the present disclosure, in the method of compensating for a color shift of the display panel provided by the embodiment of the present disclosure, a value of the preset threshold is a brightness value of the display panel without a color shift.

Wherein an optimal value of the preset threshold in the present application refers to a brightness value when the display panel normally displays a white screen.

It can be seen that the method of compensating for a color shift of the display panel provided by the embodiment of the present disclosure can compensate for a brightness value of a color shift position of the display panel to a brightness value in the case of normally displaying a white screen by the preset threshold.

Figure 4:
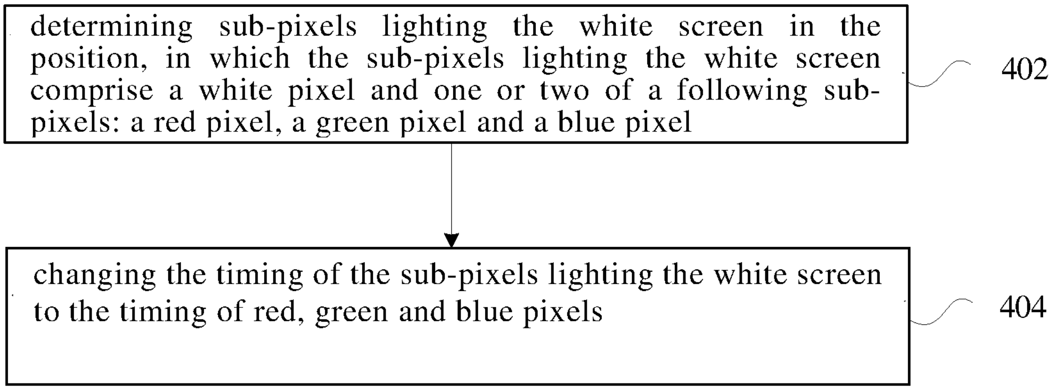
FIG. 4 is a third flow chart of a method of compensating for a color shift of a display panel in an embodiment of the present disclosure.

In a fifth embodiment of the present disclosure, changing the timing of the sub-pixels lighting the white screen in the position to the timing of red, green and blue pixels involved in step 204 of the present disclosure is as shown in FIG. 4, comprising:

Step 402: determining sub-pixels lighting the white screen in the position, in which the sub-pixels lighting the white screen comprise a white pixel and one or two of a following sub-pixels: a red pixel, a green pixel and a blue pixel;

Wherein, it should be noted that sub-pixels lighting a white screen may be a white pixel and a red pixel, combination of a white pixel and a green pixel, combination of a white pixel and a blue pixel, combination of a white pixel, a red pixel and a green pixel, combination of a white pixel, a red pixel and a blue pixel, or combination of a white pixel, a green pixel and a blue pixel.

Step 404: changing the timing of the sub-pixels lighting the white screen to the timing of red, green and blue pixels.

It can be seen that the method of compensating for a color shift of the display panel provided by the embodiments of the present disclosure can adjust the timing of the area where a color shift occurs as well as the brightness of the red pixel, the brightness of the green pixel and the brightness of the blue pixel to compensate for the color shift.

Figure 5:
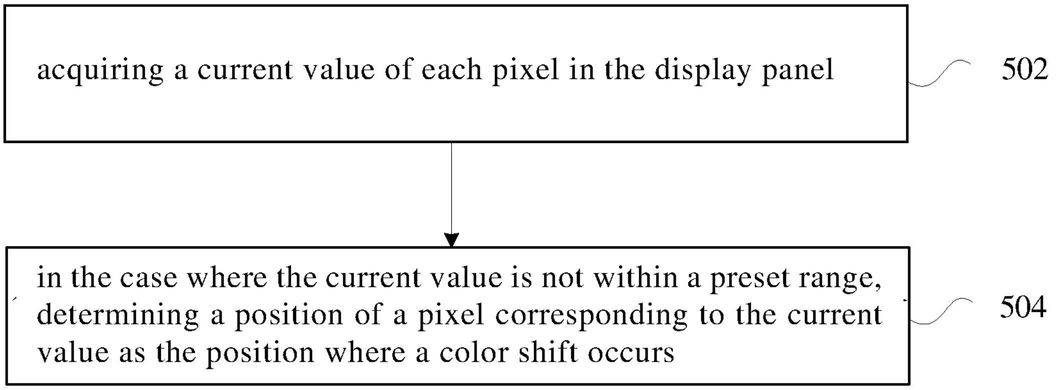
FIG. 5 is a fourth flow chart of a method of compensating for a color shift of a display panel in an embodiment of the present disclosure.

In a sixth embodiment of the present disclosure, determining the position where a color shift occurs involved in step 202 of the present disclosure is as shown in FIG. 5, comprising:

Step 502: acquiring a current value of each pixel in the display panel;

Step 504: in the case where the current value is not within a preset range, determining a position of a pixel corresponding to the current value as the position where a color shift occurs.

Figure 1:
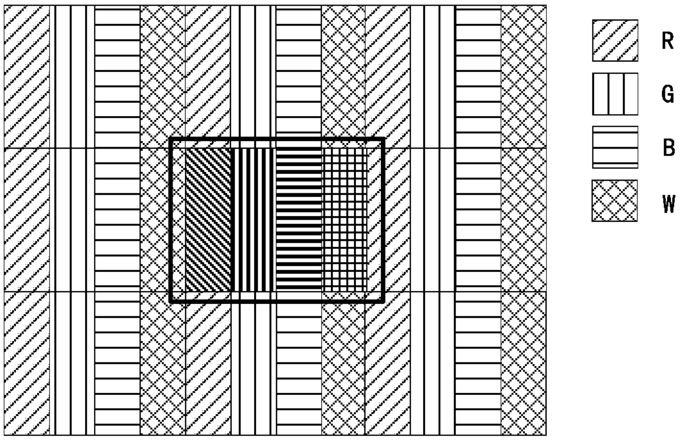
FIG. 1 is a partial schematic diagram of an OLED display panel with a color shift.
Figure 6:
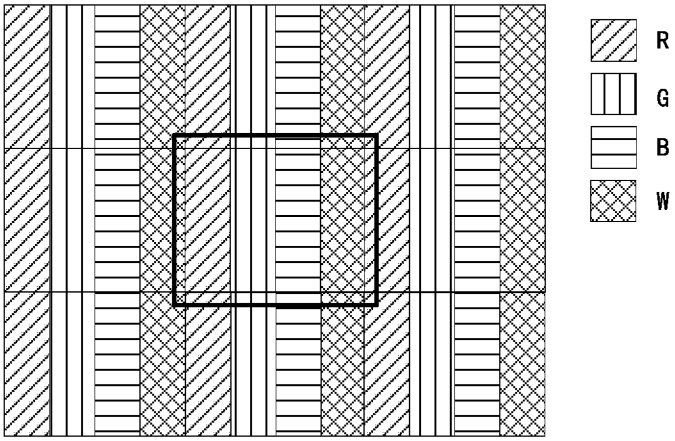
FIG. 6 is a partial schematic diagram of the display panel after color shift compensation of the display panel in an embodiment of the present disclosure.
Figure 7:
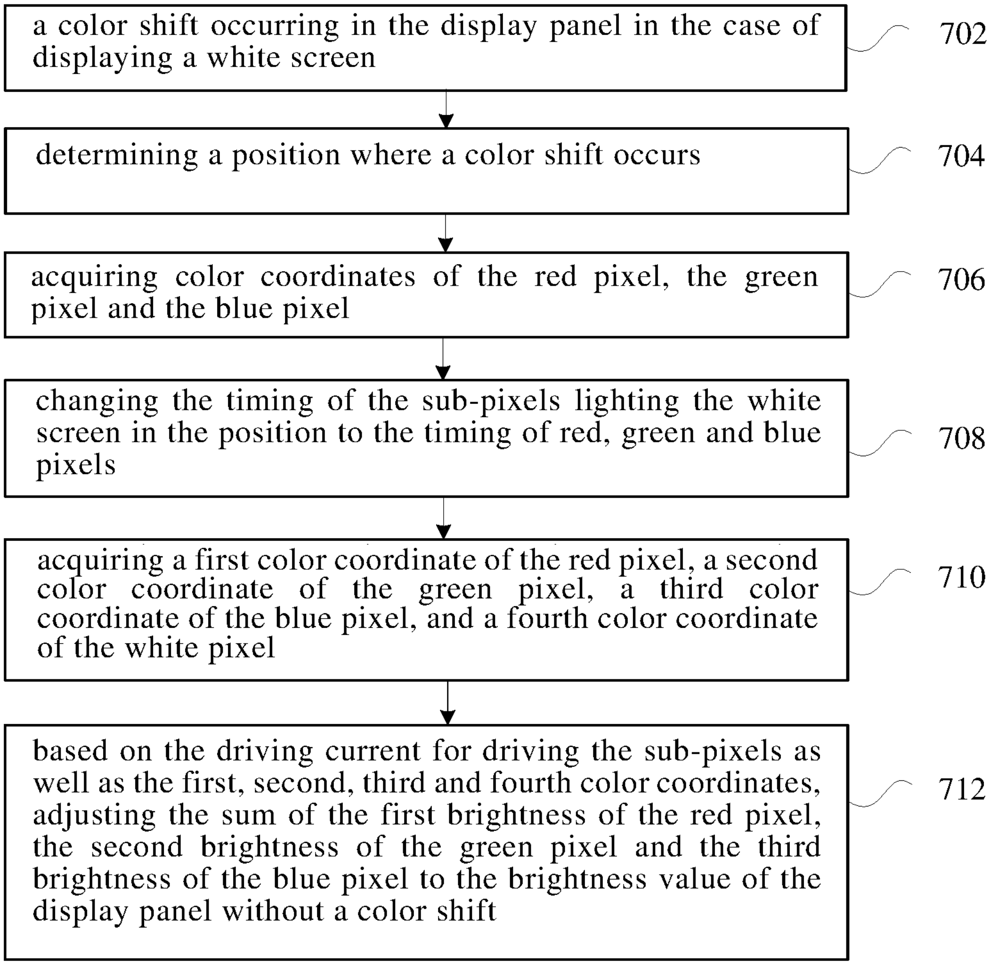
FIG. 7 is a flow chart of an exemplary example of a method of compensating for a color shift of a display panel in an embodiment of the present disclosure.

In a seventh embodiment of the present disclosure, if the position where a color shift currently occurs is as shown in FIG. 1, part of the display panel after color shift compensation by an example of the method of compensating for a color shift of the display panel in the embodiment of the present disclosure is as shown in FIG. 6, in which the area where a color shift occurs is an area within a black block, R in the color shift area is a red sub-pixel with brightness adjusted, G in the color shift area is a green sub-pixel with brightness adjusted, B in the color shift area is a blue sub-pixel with brightness adjusted, and W in the color shift area is an unlighted white sub-pixel; the process is shown in FIG. 7, comprising:

Step 702: a color shift occurring in the display panel in the case of displaying a white screen;

Step 704: determining a position where a color shift occurs;

Step 706: acquiring color coordinates of the red pixel, the green pixel and the blue pixel;

Step 708: changing the timing of the sub-pixels lighting the white screen in the position to the timing of red, green and blue pixels;

Wherein, as shown in FIG. 1, the white screen where a color shift currently occurs is lighted by a white pixel, a red pixel and a blue pixel; therefore, after the timing of the sub-pixels is adjusted, the timing of the sub-pixels lighting the white screen is changed to the timing of red, green and blue pixels, as shown in FIG. 6.

Step 710: acquiring a first color coordinate of the red pixel, a second color coordinate of the green pixel, a third color coordinate of the blue pixel, and a fourth color coordinate of the white pixel;

Step 712: based on the driving current for driving the sub-pixels as well as the first, second, third and fourth color coordinates, adjusting the sum of the first brightness of the red pixel, the second brightness of the green pixel and the third brightness of the blue pixel to the brightness value of the display panel without a color shift.

It can be seen that the method of compensating for a color shift of the display panel in the embodiment of the present disclosure can adjust the timing of the area where a color shift occurs as well as the brightness of the red pixel, the brightness of the green pixel and the brightness of the blue pixel to compensate for the color shift, that is, the timing of the area where a color shift occurs as well as the brightness of the red pixel, the brightness of the green pixel and the brightness of the blue pixel can be adjusted to compensate for the color shift in any position of the display panel, so as to solve the technical problem that the color shift repairing technology in the related art can only solve unevenness of brightness within a certain range, resulting in poor repairing effect of the display panel.

Figure 8:
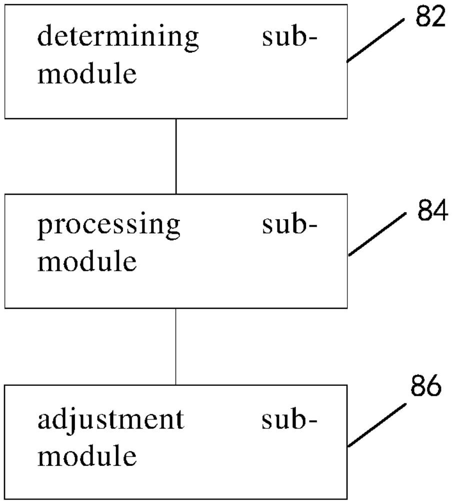
FIG. 8 is a first schematic structural diagram of a display module in an embodiment of the disclosure.

An eighth embodiment of the present disclosure provides a display module comprising a display panel and a compensation module connected to the display panel, and as shown in FIG. 8, the compensation module comprises:

- a determining sub-module 82 configured to determine a position where a color shift occurs in the case where a color shift occurs in a white screen of the display panel;
- a processing sub-module 84 configured to change a timing of sub-pixels lighting the white screen in the position to a timing of red, green and blue pixels; and
- an adjustment sub-module 86 configured to adjust brightness of the red pixel, brightness of the green pixel and brightness of the blue pixel to compensate for the color shift in the position.

In the display module provided by an embodiment of the present disclosure, in the case where a color shift occurs in the white screen of the display panel, the determining sub-module determines the position where a color shift occurs; the processing sub-module changes the timing of the sub-pixels lighting the white screen in the position to the timing of red, green and blue pixels; the adjustment sub-module adjusts the brightness of the red pixel, the brightness of the green pixel and the brightness of the blue pixel to compensate for the color shift in the position; that is, a timing of an area where a color shift occurs as well as the brightness of the red pixel, the brightness of the green pixel and the brightness of the blue pixel can be adjusted to compensate for the color shift in any position of the display panel to compensate for the color shift in the case where a color shift occurs in the white screen of the display panel, so as to solve the technical problem that the color shift repairing technology in the related art can only solve unevenness of brightness within a certain range, resulting in poor repairing effect of the display panel.

Figure 9:
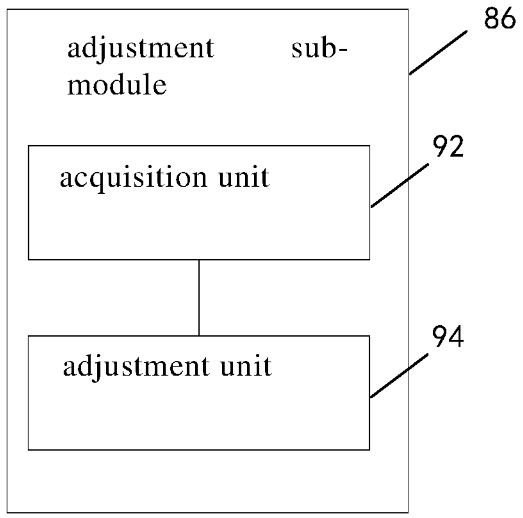
FIG. 9 is a second schematic structural diagram of a display module in an embodiment of the present disclosure.

In a ninth embodiment of the present disclosure, the adjustment sub-module 86 provided by the embodiment of the present disclosure is as shown in FIG. 9, further comprising:

- an acquisition unit 92 configured to acquire a first color coordinate of the red pixel, a second color coordinate of the green pixel, a third color coordinate of the blue pixel, and a fourth color coordinate of the white pixel; and
- an adjustment unit 94 configured to adjust the sum of first brightness of the red pixel, second brightness of the green pixel and third brightness of the blue pixel to a preset threshold to compensate for the color shift in the position based on the driving current for driving the sub-pixels and the first, second, third, and fourth color coordinates.

In a alternative implementation of the embodiment of the present disclosure, the relationship of the first color coordinate, the second color coordinate, the third color coordinate, the fourth color coordinate and the first brightness, the second brightness, the third brightness of the display module in the embodiment of the present disclosure meet the following formulae:

$$L_R = \frac{y_R[(y_W - y_G)(x_B - x_W) + (x_W - x_G)(y_W - y_B)]}{y_B[(y_W - y_g)(x_W - x_R) + (x_W - x_G)(y_R - y_W)]} L_B$$

$$L_G = \frac{y_G(y_R - y_W)[(y_W - y_G) + (x_W - x_G)(y_W - y_B)] + (y_B - y_W)[(y_W - y_G)(x_W - x_R) + (x_W - x_G)(y_R - y_W)]}{y_B(y_W - y_G)[(y_W - y_G)(x_W - x_R) + (x_W - x_G)(y_R - y_W)]} L_B$$

Wherein, $(x_R, y_R)$ is the first color coordinate, $(x_G, y_G)$ is the second color coordinate, $(x_B, y_B)$ is the third color coordinate, $(x_W, y_W)$ is the fourth color coordinate, $L_R$ is the first brightness, $L_G$ is the second brightness, and $L_B$ is the third brightness.

In an alternative implementation of the embodiment of the present disclosure, in the display module provided by the embodiment of the present disclosure, a value of the preset threshold is a brightness value in the case where no color shift occurs in the display panel.

Figure 10:
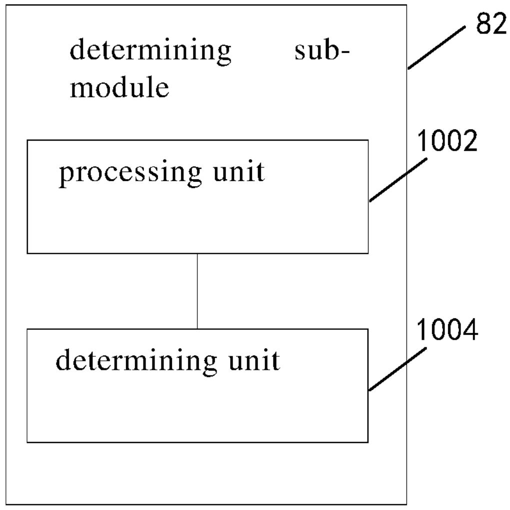
FIG. 10 is a third schematic structural diagram of a display module in an embodiment of the present disclosure.

In a tenth embodiment of the present disclosure, the determining sub-module 82 of the embodiment of the present disclosure is as shown in FIG. 10, further comprising:

- a processing unit 1002 configured to acquire a current value of each pixel in the display panel; and
- a determining unit 1004 configured to determine the position of the pixel corresponding to the current value as the position where a color shift occurs in the case where the current value is not within a preset range.

Figure 11:
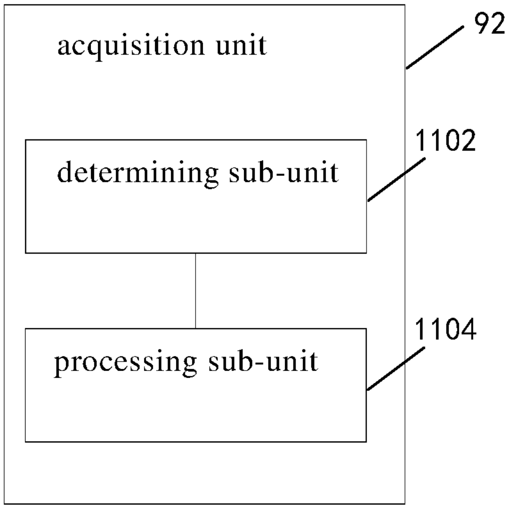
FIG. 11 is a fourth schematic structural diagram of a display module in an embodiment of the present disclosure.

In an eleventh embodiment of the present disclosure, the adjustment unit 94 provided by the embodiment of the present disclosure is as shown in FIG. 11, further comprising:

- a determining sub-unit 1102 configured to determine the sub-pixels lighting the white screen in the position, wherein the sub-pixels lighting the white screen comprise a white pixel and one or two of the following sub-pixels: red, green and blue pixels; and
- a processing sub-unit 1104 configured to change the timing of the sub-pixels lighting the white screen to the timing of red, green and blue pixels.

Figure 12:
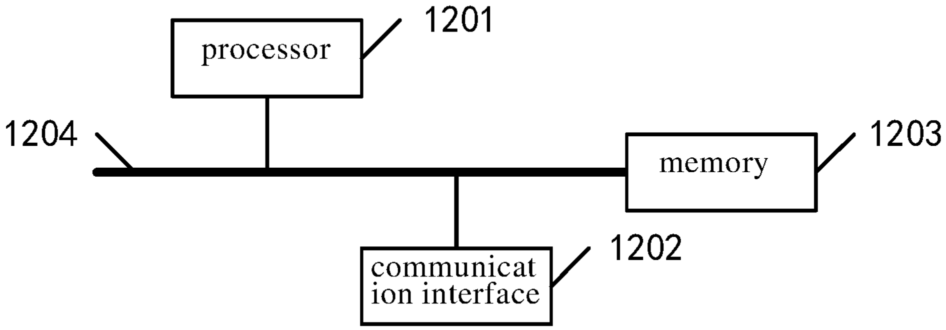
FIG. 12 is a schematic structural diagram of an electronic device in an embodiment of the present disclosure.

A twelfth embodiment of the present disclosure further provides an electronic device, as shown in FIG. 12, comprising a processor 1201, a communication interface 1202, a memory 1203 and a communication bus 1204, wherein the processor 1201, the communication interface 1202 and the memory 1203 communicate with each other via the communication bus 1204, wherein

- the memory 1203 is configured to store a computer program; and
- the processor 1201 is configured to implement the method steps in FIG. 1 when executing the program stored in the memory 1203, and functions of the processor 1201 are the same as the method steps in FIG. 1.

The communication bus mentioned in the above terminal may be a peripheral component interconnect (PCI) bus, an extended industry standard architecture (EISA) bus, or the like. The communication bus can be divided into an address bus, a data bus, a control bus, and the like. For ease of representation, the communication bus is only represented by one thick line in FIG. 12, but it does not mean that there is only one bus or one type of bus.

The communication interface is configured for communication between the above terminal and other devices.

The memory may comprise a random access memory (RAM) and a non-volatile memory, such as at least one disk memory. Alternatively, the memory may also be at least one storage device located away from the aforementioned processor.

The processor may be a universal processor comprising a central processing unit (CPU), a network processor (NP), or the like; and may also be a digital signal processor (DSP), an application specific integrated circuit (ASIC), a field-programmable gate array (FPGA) or other programmable logic devices, discrete gate or transistor logic devices, and discrete hardware components.

It should be noted herein that, relationship terms such as first and second are only used to distinguish one entity or operation from another entity or operation, and do not necessarily require or imply any actual relationship or sequence existing between these entities or operations. Moreover, the terms "comprise", "comprising" or any other variations thereof are intended to encompass a non-exclusive inclusion such that a process, method, article or device comprising a list of elements comprises not only those elements, but also elements not explicitly listed or other elements inherent to the process, method, article or device. Without further limitation, an element limited by the phrase "comprising a . . . " does not exclude the presence of additional identical elements in a process, method, article or device comprising the element.

Each embodiment in this specification is described in a related manner, and the same or similar parts of the embodiments may be referred to each other, and each embodiment focuses on the differences from other embodiments. In particular, as for the system embodiments, since they are basically similar to the method embodiments, description thereof is relatively simple, and the related parts may be referred to partial description of the method embodiments.

The above description is only preferred embodiments of the present disclosure, and is not intended to limit the protection scope of the present disclosure. Any modification, equivalent replacement, improvement and the like made within the spirit and principle of the disclosure are comprised in the protection scope of the disclosure.

What is claimed is:

1. A method of compensating for a color shift of a display panel, comprising:

- when a color shift occurs in a white screen of the display panel, determining a position where the color shift occurs;
- changing a timing of sub-pixels lighting the white screen in the position to a timing of red, green and blue pixels; and
- adjusting brightness of the red pixel, brightness of the green pixel and brightness of the blue pixel to compensate for the color shift in the position;
- wherein adjusting brightness of the red pixel, brightness of the green pixel and brightness of the blue pixel to compensate for the color shift in the position comprises:
- acquiring a first color coordinate of the red pixel, a second color coordinate of the green pixel, a third color coordinate of the blue pixel, and a fourth color coordinate of the white pixel;
- based on a driving current for driving sub-pixels as well as the first color coordinate, the second color coordinate, the third color coordinate and the fourth color coordinate, adjusting a sum of first brightness of the red pixel, second brightness of the green pixel and third brightness of the blue pixel to a preset threshold to compensate for the color shift in the position; and
- the first color coordinate, the second color coordinate, the third color coordinate, the fourth color coordinate and the first brightness, the second brightness, the third brightness meet the following formulae:

$$L_R = \frac{y_R[(y_W - y_G)(x_B - x_W) + (x_W - x_G)(y_W - y_B)]}{y_B[(y_W - y_g)(x_W - x_R) + (x_W - x_G)(y_R - y_W)]} L_B$$

$$L_G = \frac{\begin{array}{c} y_G(y_R - y_W)[(y_W - y_G) + (x_W - x_G)(y_W - y_B)] + \\ (y_B - y_W)[(y_W - y_G)(x_W - x_R) + (x_W - x_G)(y_R - y_W)] \end{array}}{y_B(y_W - y_G)](y_W - y_G)(x_W - x_R) + (x_W - x_G)(y_R - y_W)]} L_B$$

wherein, $(x_R, y_R)$ is the first color coordinate, $(x_G, y_G)$ is the second color coordinate, $(x_B, y_B)$ is the third color coordinate, $(x_W, y_W)$ is the fourth color coordinate, $L_R$ is the first brightness, $L_G$ is the second brightness, and $L_B$ is the third brightness.

2. The method according to claim 1, wherein a value of the preset threshold is a brightness value without color shift in the display panel.

3. The method according to claim 1, wherein changing a timing of sub-pixels lighting the white screen in the position to a timing of red, green and blue pixels comprises:

determining the sub-pixels lighting the white screen in the position, wherein the sub-pixels lighting the white screen comprise a white pixel and one or two of the following sub-pixels: a red pixel, a green pixel and a blue pixel; and changing the timing of the sub-pixels lighting the white screen to the timing of the red pixel, the green pixel and the blue pixel.

4. The method according to claim 1, wherein determining a position where the color shift occurs comprises:

acquiring a current value of each pixel in the display panel; and when the current value is not within a preset range, determining a position of the pixel corresponding to the current value as the position where the color shift occurs.

5. The method according to claim 4, wherein acquiring a current value of each pixel in the display panel comprises:

detecting a current value of each pixel in the display panel based on a current detector, wherein the brightness of the pixel is proportional to the current value.

6. The method according to claim 1, wherein determining a position where the color shift occurs comprises:

analyzing a brightness information of each position in the display panel based on an image detector, so as to determine the position where the brightness is less than the preset brightness value or greater than the preset brightness value as the position where the color shift occurs.

7. An electronic device comprising a processor, a communication interface, a memory and a communication bus, wherein the processor, the communication interface and the memory communicate with each other via the communication bus, wherein the memory is configured to store a computer program; and the processor is configured to implement the method steps in claim 1 when executing the computer program stored in the memory.

8. A display module comprising a display panel and a compensation module connected to the display panel, wherein the compensation module comprises:

a determining sub-module configured to determine a position where a color shift occurs when a color shift occurs in a white screen of the display panel;

a processing sub-module configured to change a timing of sub-pixels lighting the white screen in the position to a timing of red, green and blue pixels; and an adjustment sub-module configured to adjust brightness of the red pixel, brightness of the green pixel and brightness of the blue pixel to compensate for the color shift in the position;

wherein the adjustment sub-module comprises:

an acquisition unit configured to acquire a first color coordinate of the red pixel, a second color coordinate of the green pixel, a third color coordinate of the blue pixel, and a fourth color coordinate of the white pixel;

an adjustment unit configured to adjust a sum of first brightness of the red pixel, second brightness of the green pixel and third brightness of the blue pixel to a preset threshold to compensate for the color shift in the position based on a driving current for driving sub-pixels and the first, second, third, and fourth color coordinates; and the first color coordinate, the second color coordinate, the third color coordinate, and the fourth color coordinate meet the following formulae:

$$L_R = \frac{y_R[(y_W - y_G)(x_B - x_W) + (x_W - x_G)(y_W - y_B)]}{y_B[(y_W - y_g)(x_W - x_R) + (x_W - x_G)(y_R - y_W)]} L_B$$

$$L_G = \frac{\begin{array}{c} y_G(y_R - y_W)[(y_W - y_G) + (x_W - x_G)(y_W - y_B)] + \\ (y_B - y_W)[(y_W - y_G)(x_W - x_R) + (x_W - x_G)(y_R - y_W)] \end{array}}{y_B(y_W - y_G)](y_W - y_G)(x_W - x_R) + (x_W - x_G)(y_R - y_W)]} L_B$$

wherein, $(x_R,y_R)$ is the first color coordinate, $(x_G,y_G)$ is the second color coordinate, $(x_B,y_B)$ is the third color coordinate, $(x_W,y_W)$ is the fourth color coordinate, $L_R$ is the first brightness, $L_G$ is the second brightness, and $L_B$ is the third brightness.

9. The display module according to claim 8, wherein the value of the preset threshold is a brightness value of the display panel without a color shift.

10. The display module according to claim 8, wherein the adjustment unit comprises:

a determining sub-unit configured to determine the sub-pixels lighting the white screen in the position, wherein the sub-pixels lighting the white screen comprise a white pixel and one or two of the following sub-pixels: red, green and blue pixels; and a processing sub-unit configured to change the timing of the sub-pixels lighting the white screen to the timing of red, green and blue pixels.

11. The display module according to claim 8, wherein the determining sub-module comprises:

a processing unit configured to acquire a current value of each pixel in the display panel; and a determining unit configured to determine the position of the pixel corresponding to the current value as the position where a color shift occurs when the current value is not within a preset range.

12. The display module according to claim 11, wherein the processing unit comprises:

a current detector, configured to detect a value of each pixel in the display panel, wherein the brightness of the pixel is proportional to the current value.

13. The display module according to claim 8, wherein the determining sub-module comprises:

an image detector configured to analyze the brightness information of each position in the display panel, so as to determine the position where the brightness is less than the preset brightness value or greater than the preset brightness value as the position where the color shift occurs.

* * * * *